United States Patent [19]

Rubner

[11] Patent Number: 4,721,769
[45] Date of Patent: Jan. 26, 1988

[54] DIACETYLENE SEGMENTED COPOLYMERS

[75] Inventor: Michael F. Rubner, Chelmsford, Mass.

[73] Assignee: GTE Laboratories Incorporated, Waltham, Mass.

[21] Appl. No.: 867,484

[22] Filed: May 27, 1986

Related U.S. Application Data

[63] Continuation-in-part of Ser. No. 788,759, Oct. 18, 1985, abandoned, which is a continuation-in-part of Ser. No. 750,533, Jun. 28, 1985, abandoned.

[51] Int. Cl.⁴ ............................................ C08G 18/32
[52] U.S. Cl. ......................................... 528/75; 356/43
[58] Field of Search ............................. 528/75; 356/43

[56] References Cited

U.S. PATENT DOCUMENTS 4,215,208  7/1980  Yee et al. ............................. 526/285

Primary Examiner—Maurice J. Welsh
Attorney, Agent, or Firm—Hamilton, Brook, Smith & Reynolds

[57] ABSTRACT

Diacetylene segmented copolymers having first and second segments are disclosed. The preferred segmented copolymers of this invention are prepared from three basic monomers: a diisocyanate, a flexible elastomeric prepolymer and a chain extender containing a diacetylene unit. The resultant segmented copolymers exhibit the mechanical properties of elastomers and also many of the novel characteristics of the polydiacetylenes. Also for the first time, a polydiacetylene has been produced which exhibits mechanochromism.

26 Claims, 8 Drawing Figures

DIACETYLENE SEGMENTED COPOLYMERS

RELATED APPLICATIONS

This is a continuation-in-part of U.S. application Ser. No. 788,759 filed Oct. 18, 1985 which is a continuation-in-part of U.S. application Ser. No. 750,533 filed June 28, 1985 both of which are now abandoned.

FIELD OF THE INVENTION

This invention is in the field of polymer chemistry and more specifically relates to a new class of diacetylene segmented copolymers.

BACKGROUND OF THE INVENTION

The diacetylene group, —C≡C—C≡C—, is a highly reactive functionality that, in the correct solid-state geometry, can be topochemically polymerized using heat, chemical radicals, or radiation into a fully conjugated polymer with extensive pi-electron delocalization along its main chain backbone. See Wegner, G. (1979) "MOLECULAR METALS", W. E. Hatfield, ed., Plenum Press, New York and London, 209–242. Since the polymerization is topochemical, the kinetics of the reaction and the structure of the final product can be directly attributed to the geometric arrangement of the reacting groups in the solid-state. See Baughman, R. H., J. POLYM. SCI. POLYM. PHYS. ED., 12, 1511 (1974).

The fully extended unsaturated backbone of the polydiacetylenes gives rise to many of the novel properties of these materials, such as their highly anisotropic optical, electrical, dielectric, and mechanical properties. In particular, polydiacetylenes have been found to exhibit large nonlinear optical susceptibilities comparable to inorganic semiconductors making them attractive materials for optical signal processing. See Muller, H., Eckhardt, C. J., Chance, R. R., and Baughman, R. H., CHEM. PHYS. LETT., 50, 22 (1979). This is a direct consequence of the strong variations in the polarizability of the backbone which result from the one-dimensional nature of this system. Also, in some cases, it is possible to prepare large area nearly defect-free single crystals of polydiacetylenes which offer unique optical properties. See Baughman, R. H., Yee, K. C., J. POLYM. SCI. MARCROMOL. REV., 13, 219 (1978).

The vast majority of diacetylene monomers that have been prepared and polymerized are relatively small molecules which readily crystallize from melt or solution. Generally, monomers in which a diacetylene group is flanked on both sides with various organic substituents have received the most amount of attention.

By varying the composition of these organic substituents, it is possible to obtain a wide variety of polydiacetylenes with a range of physical properties. For example, Patel et al. reported the synthesis of soluble polydiacetylenes obtained by incorporating bulky side groups with the structure, $—(CH_2)_n—OCONHCH_2COOC_4H_9$ (n=3 or 4), in the monomer. See Patel, G. N., Chance, R. R., and Witt, J. D., J. CHEM. PHYS. 70, 4387 (1979). Here, dissolution was encouraged by an increase in the entropy content of the polymer brought about by surrounding the conjugated backbone with these flexible bulky sidegroups. Molecular weight determinations on these and other soluble polydiacetylenes indicate the average molecular weights to be around $10^5$–$10^6$ g/m. See Patel, G. N., Walsh, E. K., J. POLYM. SCI. POLYM. LETT. 17, 203 (1979); Wegner, G., and Wenz, G., MOL. CRYST. LIQ. CRYST., 96, 99–108 (1983).

Surface active polydiacetylenes have also been prepared by fitting the diacetylene monomer with a hydrophobic "tail" group on one side of the molecule and a hydrophilic "head" group on the other. See Tieke, B., Lieser, G., and Wegner, G., J. POLYM. SCI. POLYM. CHEM. ED., 17, 1631–1644 (1979). Such monomers can be manipulated at the air-water interface of a Langmuir-Blodgett film balance and subsequently polymerized into a polymer monolayer. This technique is currently being used to fabricate controlled thickness multilayers of polydiacetylenes suitable as optical waveguides. See Garter, G. M., Chen, Y. J., and Tripathy, S. K., APPL. PHYS. LETT., 43, 891 (1983). The polymerization of the diacetylene groups is believed to proceed via a 1, 4 addition polymerization. Wegner, G., MOLECULAR METALS, 209–242 (Plenum Press, 1979).

In addition to the polymerization of monomeric diacetylenes, it has been demonstrated that the diacetylene functionality can be incorporated in the repeat structure of a polymer backbone. These types of polymers undergo solid-state cross-polymerization on exposure to U.V. radiation forming polydiacetylene chains.

These materials have been referred to as macromonomers due to the systematic polymerization of the diacetylene units within the backbone structure of the initial polymer giving rise to a final network-like structure consisting of polymer chains both normal and parallel to the original chain direction. The term cross-polymerized is used to indicate that polymer chains are formed at regular intervals along the original polymer backbone as opposed to the typical random cross-linking that many polymers undergo when exposed to radiation. Examples of polymers containing the reactive diacetylene functionality in the repeat structure of the polymer backbone include polyurethane and polyester polymers formed by linking the appropriate difunctional monomers together and wherein one of which contains the diacetylene group. See Wegner, G., DIE MAKROMOLEKULARE CHEMIE, 134, 219–229 (1970). Alternatively, it has been found that these polymers can be synthesized by the oxidative coupling of α, ω terminal diacetylenes. See Hay, A. S., Bolon, D. A., Leimer, K. R., and Clark, R. F. POLYMER LETTERS 8, 97–99 (1970). Using this chemistry, Hay et al. prepared polymers based upon bispropargyl ethers of bisphenols which incorporate the diacetylene unit as part of their repeat structure. In addition, using similar chemistry, polymers of the type $(—(CH_2)_n—C≡C—C≡C—)_x$ have been prepared. See Day, D. and Lando, J., J. POLYM. SCI., POLYM. LETT. ED., 19, 227 (1981); Thakur, M. and Lando, J., MACROMOLECULES, 16, NO. 1, 143 (1983). In this case, it was shown that the polymers undergo a systematic cross-polymerization via the diacetylene unit to produce network-like polymers.

To date, cross-polymerized polydiacetylenes have tended to be brittle, intractable, unprocessable materials. This has been due to the fact that the rigid nature of the conjugated backbone of the polydiacetylenes precludes any post-synthesis modification of the polymer via mechanical means. Thus, current polydiacetylenes are not capable of withstanding large deformations.

SUMMARY OF THE INVENTION

This invention relates to certain segmented copolymers containing the reactive diacetylene unit in one of the segments. In one embodiment, the segmented copolymers are elastomeric materials which exhibit the novel properties of polydiacetylenes. It is believed that this unique combination of properties results from a two-phase domain structure in which the diacetylene segments reside in isolated domains, dispersed throughout a continuous matrix of a flexible elastomeric component. In such an arrangement, the diacetylene units can be cross-polymerized to the polydiacetylene form within these domains (via thermal or irradiative treatment) without the disruption of the flexible nature of the elastomeric phase. The result is a material which behaves optically as a polydiacetylene and mechanically as a tough elastomer.

In preparing a preferred segmented copolymer of this invention, a diisocyanate is first added to dry toluene and heated. This is followed by the slow addition of a flexible elastomeric prepolymer which has been dissolved in toluene. After heating for several hours, the solution is cooled and a chain extender containing a diacetylene unit is added. This solution is then heated for about three hours and the solution is cooled and the newly formed segmented copolymer is precipitated in a non-solvent.

An advantage of these diacetylene segmented copolymers is that upon cross-polymerization the resultant product retains elastomeric properties. As a result of this, cross-polymerized diacetylene copolymers have been produced which exhibit reversible mechanochromic properties, i.e., the optical absorption characteristics of the material can be manipulated by mechanical means such as stretching. Also, it is possible to produce cross-polymerized elastomeric-diacetylene copolymers which exhibit thermochromic properties, i.e., the color of the material can be changed upon heating or cooling.

Another advantage of diacetylene segmented copolymers is that they provide polydiacetylenes which are highly extensible and thus capable of withstanding large deformations. Thus, in accordance with this invention, materials can be provided that are tough, flexible, and in general exhibit the properties of elastomers and yet also exhibit the unique optical properties of the polydiacetylenes.

DETAILED DESCRIPTION

Figure 1:
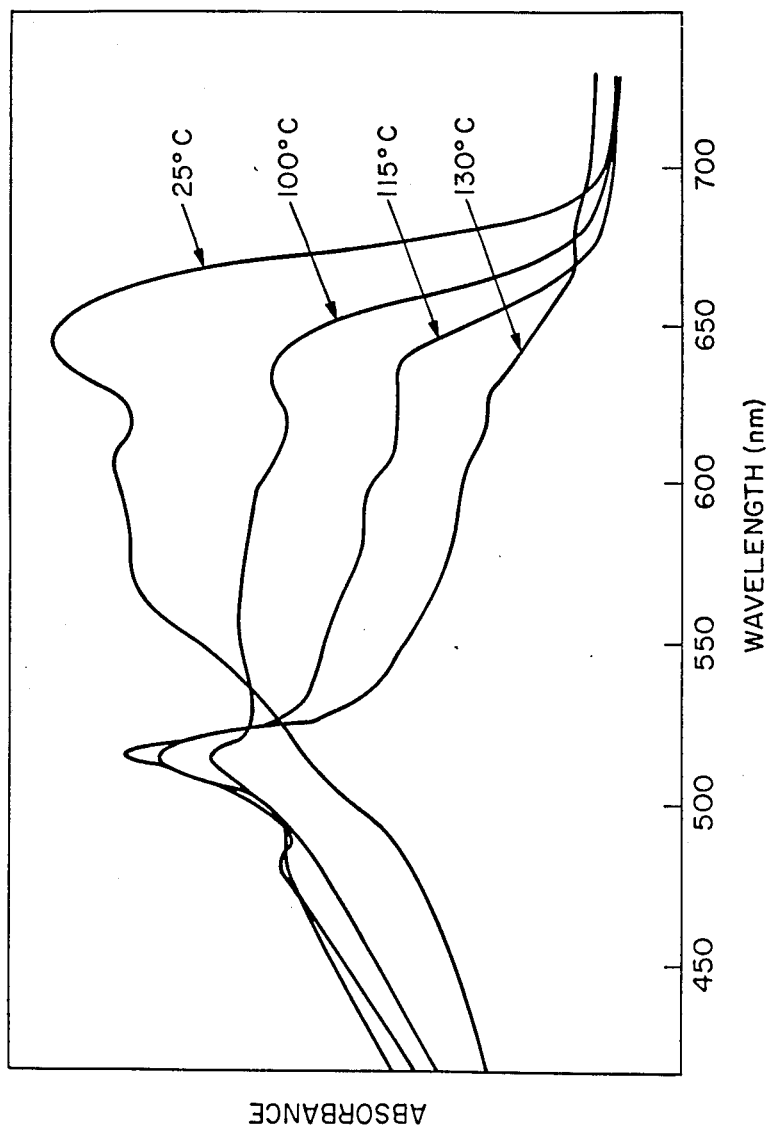
FIG. 1 is a plot of the visible absorption spectra of the diacetylene-segmented copolymer HDI-5,7-PTMO-1000 as a function of temperature.

A preferred embodiment of this invention is a copolymer which contains a soft-flexible segment which phase separates or is incompatible with the segment containing the diacetylene group. Soft flexible segments are linear chains which at service temperatures are sufficiently above their glass transition temperature or in the case of crystallizable soft segments are above their melting temperatures so that they exhibit "rubber-like" properties and thus give the material a high extensibility. An example of such a diacetylene-segmented copolymer can be prepared using urethane chemistry and a two-step solution polymerization technique. For a recent example of this method, see Miller, J. A., Lin, S. B., Hwang, K. S., Wu, K. S., Gibson, P. E., and Cooper, S. L., MACROMOLECULES, 18, (1985), the teachings of which are hereby incorporated by reference.

In the first step of a two-step solution polymerization technique using urethane chemistry, a hydroxyl or carboxyl terminated prepolymer is end-capped with isocyanate groups. The second step is a step-wise reaction of the isocyanate groups with a diol or a diacid which in this case contains a diacetylene functionality within the molecule. This chain extension step increases the molecular weight of the polymer as the newly formed urethane or amide linkages join the molecules together. The diisocyanates actually used were 4,4'-methylene bis (phenylisocyanate) (called MDI) and hexamethylene diisocyanate (called HDI). The diacetylene diols used were 2,4-hexadiyne 1,6 diol, 5,7-dodecadiyne 1,12 diol and 10,12-docosadiyne-1,22-diol. From this point on, samples will be designated by the monomers used to synthesize the elastomers. For example, MDI-2,4-PTMO-1000 refers to an elastomer that was prepared from MDI, 2,4 hexadiyne 1,6 diol, and poly (tetramethylene oxide) (PTMO) of molecular weight 1000. This synthesis can be shown by the following illustration.

General Reaction Scheme step {1}

step {2}

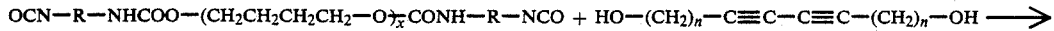

-continued
General Reaction Scheme

Where: the diisocyanate is
MDI when

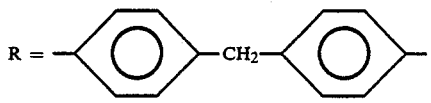

and
HDI when R=—(CH$_2$)$_6$—
the diol is
2,4 hexadiyne 1,6 diol when n=1,
5,7 dodecadiyne 1,12 diol when n=4, and
10,12 docosadiyne 1,22 diol when n=9.

The molar ratios of the reactants can be varied to obtain copolymers with different compositions and hard segment distributions. Also, different molecular weights of PTMO can be used such as 2000 molecular weight PTMO. The reactants can be mixed during processing, such as in reaction injection molding techniques to produce the desired segmented copolymers. Trifunctional reactants can also be used to generate cross-linked or branched segmented copolymers which contain the reactive diacetylene group in their structure. For a general description of polyurethane chemistry see "Advances in Polyurethane Technology" edited by J. M. Baist and H. Gudgeon, (John Wiley and Sons, Inc., New York, 1968), the teachings of which are hereby incorporated by reference.

Using the above polymerization scheme, tough flexible polyurethane-diacetylene elastomers are formed which are soluble in organic solvents, such as toluene and tetrahydrofuran (THF). Upon exposure to UV radiation or thermal energy, the elastomers are converted into polydiacetylene network polymers as evidenced by the dramatic color changes which occur as the conjugated backbone of the polydiacetyene is formed.

The polyurethane-diacetylene elastomers which have been produced according to this invention, however, are by no means the only segmented copolymers that would be expected to exhibit these novel properties. This becomes evident after examining the structure and properties of different prepolymers and diacetylene monomers which can be utilized in the synthesis of the segmented copolymers.

For example, the soft-segment prepolymer (PTMO in the above reaction) has been referred to as a telechelic polymer because it contains two functional end groups. Other telechelic polymers fitted with suitable reactive end groups such as hydroxyl, carboxyl, amino, etc., can be readily prepared using a number of well established synthetic techniques. For example, the prepolymers can be synthesized by:
1. Free radical polymerization of vinyl monomers with initiators that supply —OH or —COOH end groups such as 4,4' azobis (4-cyano-n-pentanol) and 4,4'—azobis (4-cyanovaleric acid).
2. Cationic polymerization of monomers using dichloro compounds such as p-di(2-chloropropyl) benzene which function as both initiators and transfer agents to produce —Cl end groups which can be readily converted to —OH end groups.
3. Anionic polymerization using bifunctional initiators such as sodium naphthalene which produce reactive "living ends" which can be subsequently fitted with —OH, —COOH, —COCL end groups by reaction with electrophiles such as ethylene oxide, carbon dioxide, and phosgene, respectively. This is the most often used method.
4. Step growth polymerization with a slight excess of the monomer containing the functional group desired at the end of the molecule. For example, to obtain —NH$_2$ end groups an excess of the diamine would be used when polymerized with a diacid.

For a further explanation of these synthetic techniques, see Odian G., PRINCIPLES OF POLYMERIZATION, (John Wiley and Sons, Inc., 1981), the teachings of which are hereby incorporated by reference.

The following general formula illustrates the monomer containing the diacetylene groups used to chain extend the prepolymers.

R can be any atom or group of atoms terminated with a functional group capable of undergoing step-growth reactions. Examples of such functional groups are hydroxyl, carboxyl, isocyanate, amine, or anhydride. Diacetylene monomers can be easily fitted with functional end groups via oxidative coupling of terminal acetylenes as described, for example, in CHEMISTRY OF ACETYLENES, Viehe, H. G., Ed., pp. 598-647 (Marcel Dekker, New York, 1968), the teachings of which are hereby incorporated by reference.

The segmented copolymers are then formed by the reaction of a prepolymer and a diacetylene monomer containing suitable reactive end groups. For example, the following are common functional groups that react to form links in a polymer chain:
alcohol+carboxylic acid=ester linkage
alcohol+isocyanate=urethane linkage
amine+carboxylic acid=amide linkage
carboxylic acid+isocyanate=amide linkage
(there are many other possibilities).

Another important variable is the structure of the low molecular weight soft segment. In the embodiment described above, this segment was poly(tetramethylene oxide) (PTMO). Other possibilities include: low molecular weight siloxanes, e.g., poly (dimethyl siloxane) (see Example 6), polyesters, e.g., poly (butylene adipate), diene rubbers (see Examples 7 and 8), or any other low glass transition temperature polymers fitted with suitable reactive functional groups so as to generate segmented copolymers during reaction with the diacetylene containing molecules.

A preferred embodiment of this invention contains a soft-flexible segment which is phase separable or is incompatible with the diacetylene containing segment. In one phase of the copolymer will reside the diacetylene group and in the other phase will reside the soft-flexible segment.

These segmented copolymers can be cross-polymerized. This cross-polymerization can be brought about by exposing the polymers to ionizing or electromagnetic radiation or by thermal treatment. These polymers are systematically cross-polymerized through the diacetylene units in the backbone giving rise to a network-like structure containing polydiacetylene chains normal to the original host polymer chain direction. Cross-polymerization is best achieved when the segments of the copolymer are incompatible such that phase separation occurs and the phase containing the diacetylene unit is crystalline.

The presence of the reactive diacetylene groups within the phase separated domains of the elastomer affords a relatively easy way to modify the mechanical properties of the elastomer by controlling the extent of cross-polymerization of these units. Since the diacetylene groups reside mostly in a separate phase, the flexible elastomeric segments of the copolymer will not be affected by the cross-polymerized reaction. Thus, modification of the mechanical properties of the elastomer is a result of a "hardening" of the discontinuous diacetylene domains of the copolymer which are dispersed throughout the continuous soft matrix.

Certain segmented copolymers of this invention exhibit thermochromic properties. "Thermochromic" as used herein refers to a reversible color change upon heating or cooling which is observed in some of the diacetylene-segmented copolymers of this invention.

Certain segmented copolymers of this invention exhibit mechanochromic behavior. By "mechanochromic" it is meant that the optical absorption of the material in the visible portion of the spectrum can be manipulated by mechanical means, such as stretching. This property has heretofore never been seen in polydiacetylenes; it is unique to diacetylene segmented copolymers. See for example, FIG. 3.

In preparing a preferred segmented copolymer of this invention, a diisocyanate is first added to dry toluene and heated. This is followed by the slow addition of a flexible elastomeric prepolymer which has been dissolved in toluene. After heating for several hours, the solution is cooled and a chain extender containing a diacetylene unit is added. This solution is then heated for about three hours and the solution is cooled and the newly formed segmented copolymer is precipitated in a non-solvent.

This invention will be further and more specifically described by the following examples.

EXAMPLE 1

Synthesis of MDI-2,4-PTMO-1000

Materials Used

Diisocyanate: 0.005 moles (1.29 grams) of MDI
Prepolymer: 0.00257 moles (2.577 t grams) of PTMO (molecular weight 1000)
Chain Extender: 0.00257 moles (0.2827 grams) of 2,4-hexadiyne 1,6 diol
Dry Toluene
Methanol Procedure To a three neck round bottom flask equipped with a mechanical stirrer, addition funnel, and nitrogen purge, the following were added:
1. 0.005 moles (1.29 grams) of the diisocyanate 4, 4'-Methylenebis (phenylisocyanate) (MDI) and 30 ml of dried toluene. This solution was then warmed to 70° C. [The MDI had been vacuum distilled at 150° C. (20 microns) and stored under dry nitrogen. The toluene had been distilled over sodium metal under dry nitrogen.]
2. This was followed by the slow addition of 0.00257 moles (2.577 grams) of the prepolymer poly (tetramethylene oxide) (PTMO) in 30 ml of toluene (added over 1 hour). [The PTMO (1000 molecular weight) had been dried under vacuum (1 micron) at 80° C. for 3 days prior to use to remove water.]
3. The resultant solution was then refluxed for 3 hours at 80° C. The solution was then cooled to room temperature and 0.00257 moles (0.2827 grams) of the chain extender 2,4-hexadiyne 1,6 diol was added. [The 2,4-hexadiyne 1,6 diol had been recrystallized from toluene at about 90° C. and vacuum dried for 4 hours.]
4. The solution was subsequently heated to 60° C. for 3 hours. The elastomer was then precipitated in methanol and washed to remove unreacted impurities with 1000 ml of methanol and vacuum dried for 36 hours to produce a tough flexible polyurethanediacetylene segmented copolymer.

All manipulations of reagents were carried out in an inert atmosphere using vacuum line techniques.

EXAMPLE 2

Synthesis of MDI-5,7-PTMO-pb 1000

The procedure and reactants were the same as those employed in Example 1, except as follows: 0.00257 moles (0.5 grams) of the chain extender 5,7 dodecadiyne 1,12 diol were added in place of 2,4 hexadiyne 1,6 diol. [The 5,7 dodecadiyne 1,12 diol had been recrystallized from ethyl ether at 0° C. and vacuum dried for 4 hours.]

EXAMPLE 3

The Synthesis of HDI-2,4-PTMO-1000

The procedure and reactants of Example 1 were employed except as follows:
0.005 moles (0.84 grams) of the diisocyanate hexamethylene diisocyanate (HDI) were used in place of MDI and 0.05 grams of dibutyltinbis (2-ethylhexanoate) were added to the initial solution as a catalyst. [The HDI had been vacuum distilled at 70° C. (10 microns) and stored under dried nitrogen.]

EXAMPLE 4

The Synthesis of HDI-5,7-PTMO-1000

The procedure and reactants of Example 3 were employed except as follows:
0.00257 moles(0.5 grams) of the chain extender 5,7-dodecadiyne 1, diol were added in place of 2,4-hexadiyne 1,6 diol.

EXAMPLE 5

The Synthesis of HDI-10,12-PTMO-1000

The procedure was the same as that employed in Example 1, using the following amounts of the three basic reactants:
Diisocyanate: 0.016 moles (2.69 grams) of hexamethylene diisocyanate (HDI)
Prepolymer: 0.008 moles (8 grams) of poly(tetramethylene oxide) of molecular weight 1000
Chain extender: 0.008 moles (2.68 grams) of 10,12 docosadiyne 1,22 diol The resultant segmented copolymer turned deep purple after cross-polymerization by U.V. light indicative of the formation of the polydiacetylene network structure within the hard domains.

EXAMPLE 6

The Synthesis of HDI-5,7-PDMS-2400

The procedure was the same as that employed in Example 1, using the following amounts of the three basic reactants:

Diisocyanate: 0.02 moles (3.37 grams) of hexamethylene diisocyanate (HDI)
Prepolymer: 0.01 moles (24 grams) of carbinol terminal poly(dimethylsiloxane) (PDMS) of molecular weight 2400
Chain extender: 0.01 moles (1.95 grams) of 5,7 dodecadiyne 1,12 diol The segmented copolymer was precipitated in heptane and subsequently washed with fresh heptane to remove unreacted impurities. This illustrates that hydroxy terminated siloxane prepolymers can be used to generate the soft segment material in the segmented copolymers. The resultant material turned deep blue after cross-polymerization by U.V. light.

EXAMPLE 7

The Synthesis of HDI-5,7-HTPBD-2000

The procedure was the same as that employed in Example 1, using the following amounts of the three basic reactants:

Diisocyanate: 0.02 moles (3.37 grams) of hexamethylene diisocyanate (HDI)
Prepolymer: 0.01 moles (20 grams) of hydroxy terminated cis-polybutadiene (HTPBD) of molecular weight 2000
Chain extender: 0.01 moles (1.95 grams) of 5,7 dodecadiyne 1,12 diol The segmented copolymer was precipitated in heptane and subsequently washed with fresh heptane to remove unreacted impurities.

This illustrates that hydroxy terminated butadiene prepolymers can be used to generate the soft segment material in the segmented copolymers. The resultant material turned deep blue on exposure to U.V. light.

EXAMPLE 8

The Synthesis of HDI-5,7-CTPBD-1350

The procedure was the same as that employed in Example 1, using the following amounts of the three basic reactants:

Diisocyanate: 0.02 moles (3.37 grams) of hexamethylene diisocyanate (HDI)
Prepolymer: 0.01 moles (13.5 grams) of carboxy terminated cis-polybutadiene (CTPBD) of molecular weight 1350
Chain extender: 0.01 moles (1.95 grams) of 5,7 dodecadiyne 1,12 diol The segmented copolymer was precipitated in heptane and subsequently washed with fresh heptane to remove unreacted impurities.

This illustrates that carboxy terminated butadiene prepolymers can also be used to generate the soft segment material in the segmented copolymers. In this case the linkage formed between the soft segment material and the diisocyanate was an amide linkage. The resultant material turned deep blue after cross-polymerization by U.V. light.

EXAMPLE 9

The Synthesis of MDI-10,12-A-PTMO-1000

The procedure was the same as that employed in Example 1, using the following amounts of the three basic reactants:

Diisocyanate: 0.005 moles (1.29 grams) of MDI
Prepolymer: 0.00257 moles (2.57 grams) of hydroxy terminated poly(tetramethylene oxide) of molecular weight 1000
Chain extender: 0.00257 moles (0.93 grams) of 10,12 docosadiyne 1,22 dioic acid This illustrates that carboxy terminated chain extenders can be used to generate the hard segment material in the segmented copolymers. In this case, the chain extender and the diisocyanate are linked by an amide group. The resultant material turned pale blue on exposure to U.V. light.

EXAMPLE 10

The Synthesis of MDI-2,4-PTMO-2000 by Single Step Method

Materials Used

Diisocyanate: 0.03 moles (7.45 gms) of MDI
Prepolymer: 0.01 moles (20 gms) of PTMO (molecular weight 2000)
Chain extender: 0.02 moles (2.2 gms) of 2,4 hexadiyne 1,6 diol
0.05 gms of dibutyltinbis (2-ethylhexanoate)
300 ml of toluene Methanol

Procedure

To a 3-neck round bottom flask equipped with a mechanical stirrer, addition funnel, and nitrogen purge, 0.03 moles (7.5 grams) of the diisocyanate MDI, 0.01 moles (20 grams) of the prepolymer PTMO (molecular weight 2000), 0.05 grams of dibutyltinbis (2-ethylhexanoate) and 0.02 moles (2.2 grams) of the chain extender 2,4-hexadiyne 1,6 diol were added with 300 ml of toluene. The reaction mixture was then heated to 60° C. for 2–4 hours followed by precipitation of the elastomer with methanol. The product was then washed with 1000 ml of methanol and vacuum dried for 36 hours.

EXAMPLE 11

Cross-Polymerization of Segmented Copolymers

Thin films of the elastomers were exposed to a 254 nm U.V. light of 1 mW/cm$_2$ power density for 15 minutes or annealed at 90° C. for 2–3 hours in the case of MDI-2,4-PTMO-1000 and MDI 5,7-PTMO-1000. The resultant spectral changes were recorded using a Cary 17 spectrophotometer. MDI-2,4-PTMO-1000 turned blue during this process and developed an absorption band in the visible portion of the spectrum with a maximum at 630 nm. MDI-5,7-PTMO-1000 and HDI-2,4-PTMO-1000 turned red with maxima at about 580 nm. HDI-5,7-PTMO-1000 turned blue as it was crosspolymerized with a maximum at 650 nm.

EXAMPLE 12

Thermochromic Properties of HDI-5,7-PTMO-1000

The thermochromic properties were evaluated by casting thin films of the elastomer onto a temperature-controllable transparent tin oxide coated glass substrate.

The elastomer was cross-polymerized before measurements were made.

The visible absorption spectra of a thin film of cross-polymerized (15 min. exposure to U.V. light 1mW/cm$^2$ power density) HDI-5,7-PTMO-1000 as a function of temperature are shown in FIG. 1. These spectra show that the position of the absorption band of this elastomer in the visible region is highly dependent on temperature. The sample changes in color continuously from blue to red as it is heated from room temperature to higher temperatures. It has been found by recycling experiments that this material is reversibly thermochromic as long as the temperature does not exceed 115° C. Thus, this is an example of an elastomeric material with reversible thermochromic properties.

EXAMPLE 13

The Visible Absorption Spectra of a Thin Film of Cross-Polymerized HDI-5,7-PTMO-1000 as a Function of Strain A thin film of HDI-5,7-PTMO-1000 was clamped at a known distance, stretched and its elongation was measured. This stretched material was then placed in a spectrophotometer and its absorption was measured at different strains.

Figure 2:
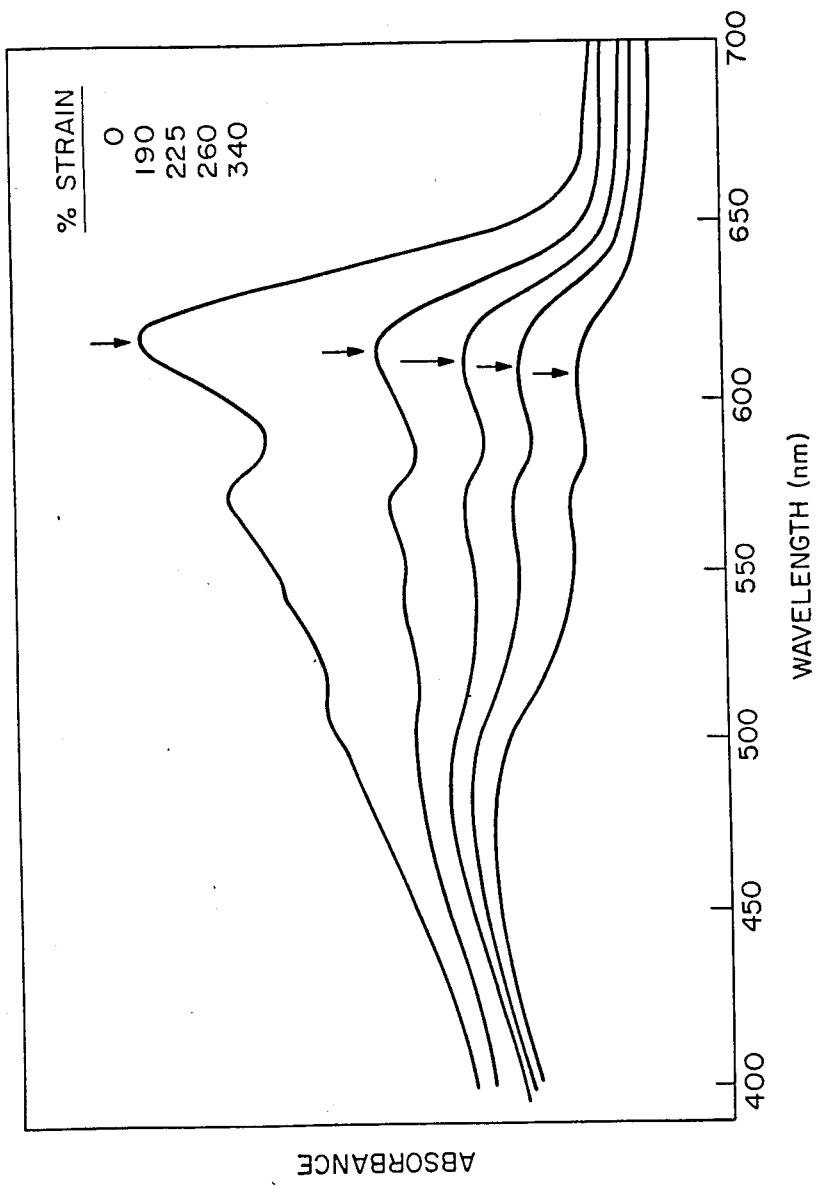
FIG. 2 is a plot of the visible absorption spectra of a thin film of the cross-polymerized diacetylene-segmented copolymer HDI-5,7-PTMO-1000 as a function of strain.

The visible absorption spectra of a thin film of cross-polymerized (30 seconds exposure to UV light of 1 mW/cm$^2$ power density) HDI-5,7-PTMO-1000 as a function of strain are shown in FIG. 2. These spectra show that the position and shape of the absorption band of this elastomer in the visible region are highly dependent on strain. The sample changed in color continuously from blue to redpurple as it was stretched. The material is reversibly mechanochromic as long as the strain does not exceed 200%.

EXAMPLE 14

The Visible Absorption Spectra of HDI-2,4-PTMO-1000 as a Function of Strain

A sample of HDI-2,4-PTMO-1000 was clamped at a known distance, stretched and its elongation was measured. This stretched material was then placed in a spectrophotometer and its absorption was measured.

Figure 3:
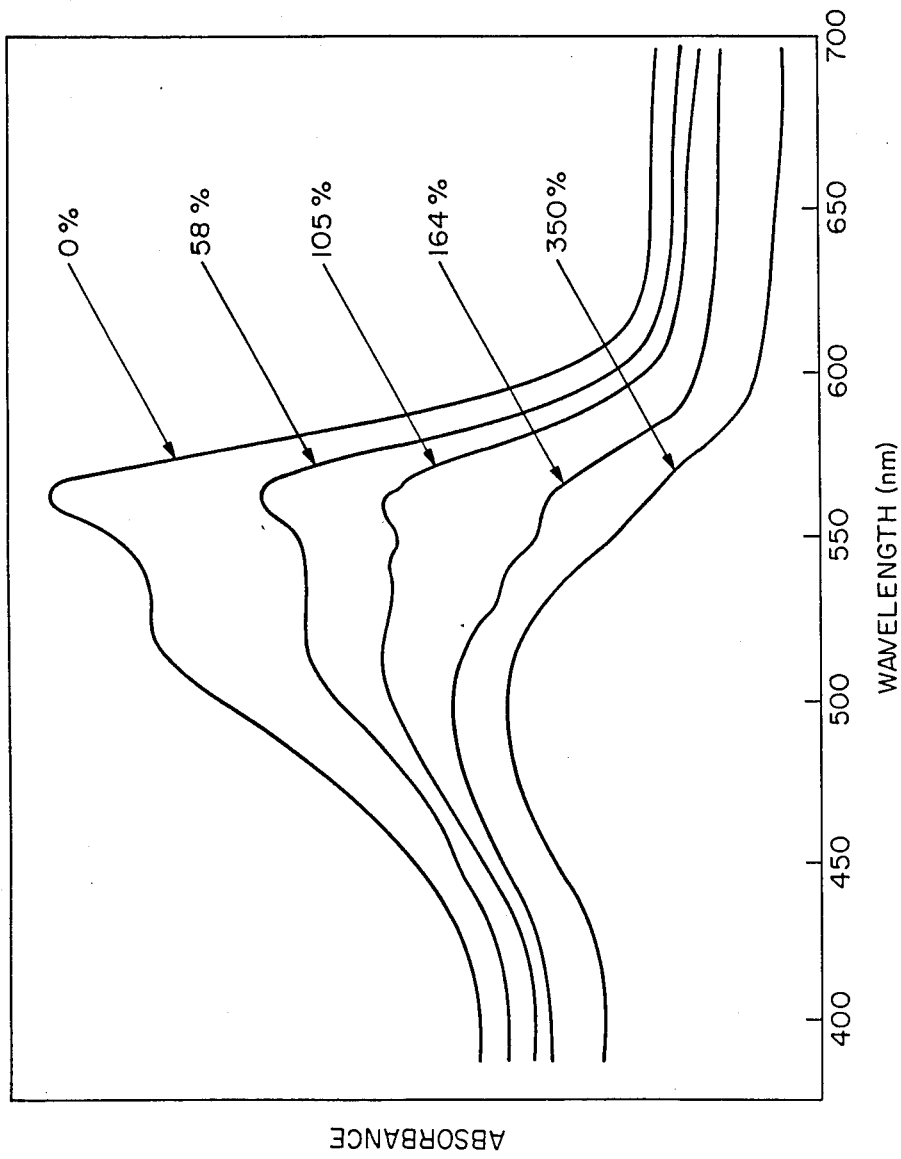
FIG. 3 is a plot of the visible absorption spectra of the diacetylene-segmented copolymer HDI-2,4-PTMO-1000 as a function of strain.

The visible absorption spectra of a thin film of cross-polymerized (30 seconds exposure to UV light of 1 mW/cm$^2$ power density) HDI-2,4-PTMO-1000 as a function of strain are shown in FIG. 3. These spectra show that the position and shape of the absorption band of this elastomer in the visible region are highly dependent on strain. The sample changed in color continuously from red to yellow as it was stretched. The material is reversibly mechanochromic as long as the strain does not exceed about 110%.

EXAMPLE 15

The Processability Of An Elastomeric-Diacetylene Copolymer

A sample of MDI-2,4-PTMO-1000 was cut into small sections and placed into a stainless steel mold with dimensions 2 mm $\times$ 1 mm $\times$ 3 mm for the length, thickness, and width respectively. The mold was then compressed at 600 PSI and heated at 115° C. for 5 minutes. When the sample was withdrawn from the cavity, it had coalesced into a continuous piece with the dimensions of the mold. This shows that the elastomers can be processed as other polyurethane elastomers which are known to exhibit thermoplastic behavior.

EXAMPLE 16

The Simultaneous Processing and Cross-Polymerization Of An Elastomeric-Diacetylene Copolymer The procedure as described in Example 15 was repeated except that the sample was heated for 2 hours. In this case, the sample besides taking on the shape of the mold also was thermally cross-polymerized into the polydiacetylene network as evidenced by a color change from clear to dark blue.

EXAMPLE 17

The Thermomechanical Analysis of Elastomeric-Diacetylene Segmented Copolymers

Thermal Mechanical Analysis (TMA) of MDI-2,4-PTMO-1000, MDI-5,7-PTMO-1000, HDI-2,4-PTMO-1000 and HDI-5,7-PTMO-1000 was performed on a DuPont 990 Thermal Analyzer equipped with a TMA module. The technique comprises placing a probe on the sample to be evaluated and monitoring the penetration (or expansion) of the probe into the material as a function of temperature. In this case, the probe was loaded with a 20 gram weight to enhance penetration into the sample at softening points of the polymer.

Figure 4:
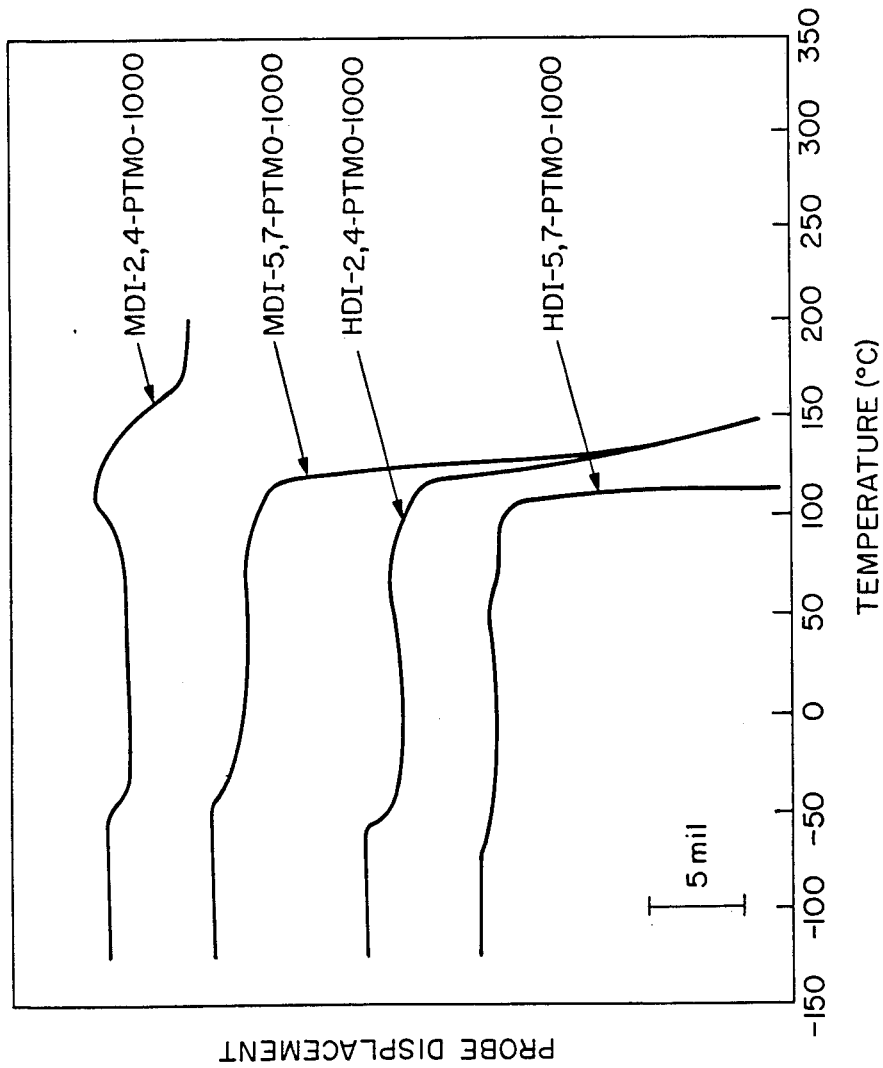
FIG. 4 is a plot of the thermomechanical analysis of four diacetylene-segmented copolymers. It measures probe displacement as a function of temperature.
Figure 5:
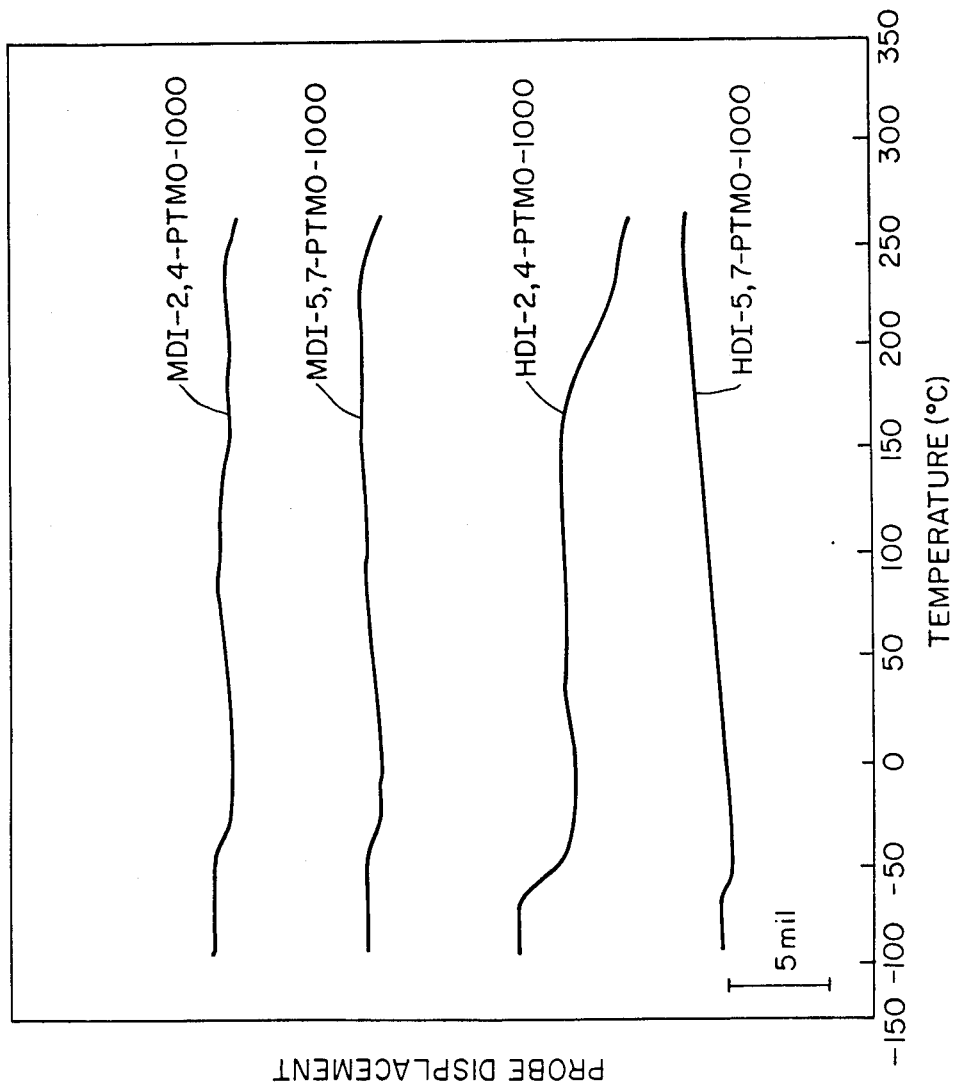
FIG. 5 shows the thermomechanical analysis of four diacetylene-segmented copolymers after exposure to gamma radiation for two weeks. It measures probe displacement as a function of temperature.

Elastomers molded into plaques 1 mm thick at 120° C. and 600 psi were subjected to thermal mechanical analysis (TMA). FIG. 4 shows that by about 120° C. all of the elastomers have undergone a major softening due to melting (MDI-2,4-PTMO-1000 does not melt but does soften). FIG. 5 shows the TMA scans for the elastomers after exposure to gamma radiation (CO$^{60}$ source) for two weeks. This figure shows that cross-polymerization has resulted in materials that do not soften until much higher temperatures and in some cases not at all below 250° C. Also it can be seen that the glass transition temperature of the elastomers in the range of $-50°$ to $-75°$ C. has not been affected by the cross-polymerization reaction. Thus, cross-polymerization is restricted to the hard domains and the elastomeric domains remain intact.

This illustrates that the presence of the reactive diacetylene groups in the hard domains can be used to modify the thermal mechanical properties of the elastomer subsequent to fabrication into a desired form. For example, the elastomer can be molded into any shape at fairly low temperatures and then exposed to suitable radiation to form the polydiacetylene chains within the hard domains. The final cross-polymerization process generates a network-like structure in the hard domains which stabilizes them to higher temperatures. The result is a material that can be processed at lower temperatures and yet when formed and stabilized has a much higher use temperature than originally dictated by its processing temperature.

EXAMPLE 18

Figure 6:
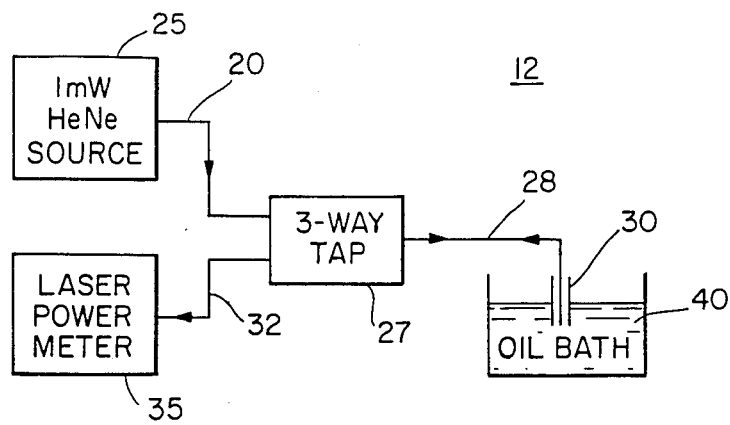
FIG. 6 shows a schematic of an experimental set-up for the evaluation of fiber optic temperature sensors.

Diacetylene-Segmented Copolymer As a Sensing Element In A Fiber Optic Temperature Sensor The diacetylene-segmented copolymer HDI-5,7-PTMO-1000 was evaluated as a sensing element using the fiber optic system shown in FIG. 6.

The fiber optic system 12 of FIG. 6 consists of a 1 mW HeNe laser source 25 which transmits a laser beam through optical fiber 20 into a LANtap GTE coupler 27 which directs the laser beam through another series of optical fibers 28. A fiber cap 30 of FIGS. 6 and 7 lies at the end of the optical fiber 28. A mirror 11, part of the fiber cap 30, FIG. 7, then reflects the light back through the optical fiber 28. The light travels into the LANtap GTE Coupler 27 which directs it through another series of optical fibers 32 into a laser power meter 35 which measures the intensity of the light.

Figure 7:
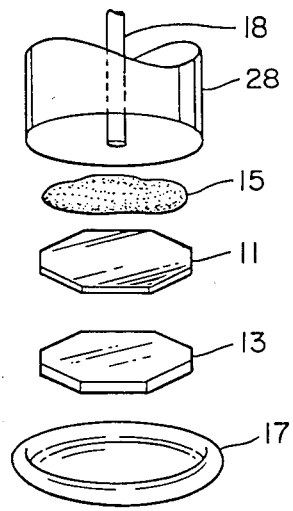
FIG. 7 is a composite diagram of a fiber cap and optical fiber used in the fiber optic system depicted in FIG. 6.

The fiber cap is comprised of a glass cover slip 13, FIG. 7, onto which a silver mirror 11 fits. Onto the silver mirror is placed a sample of the copolymer 15. The entire assemblage is then attached by means of an epoxy resin 17 to the end of the optical fiber 28 distal from the LANtap GTE Coupler 27. The end cap is so placed onto the end of optical fiber 28 such that the glass core 18 of the optical fiber, FIGS. 6 and 7, is in contact with the copolymer sample 15.

Accordingly, a thin film of the copolymer HDI-5,7-PTMO-1000, as in 15 FIG. 7, was cast onto a silver mirror 11 from a solution of 0.02 grams of HDI-5,7-PTMO-1000 in 20 ml of toluene. The coated mirror 11 was then exposed to U.V. light for 30 minutes (254 nm, 1 mW/cm$^2$ intensity) to cross-polymerize the copolymer. The fiber cap was then assembled as previously described.

Figure 8:
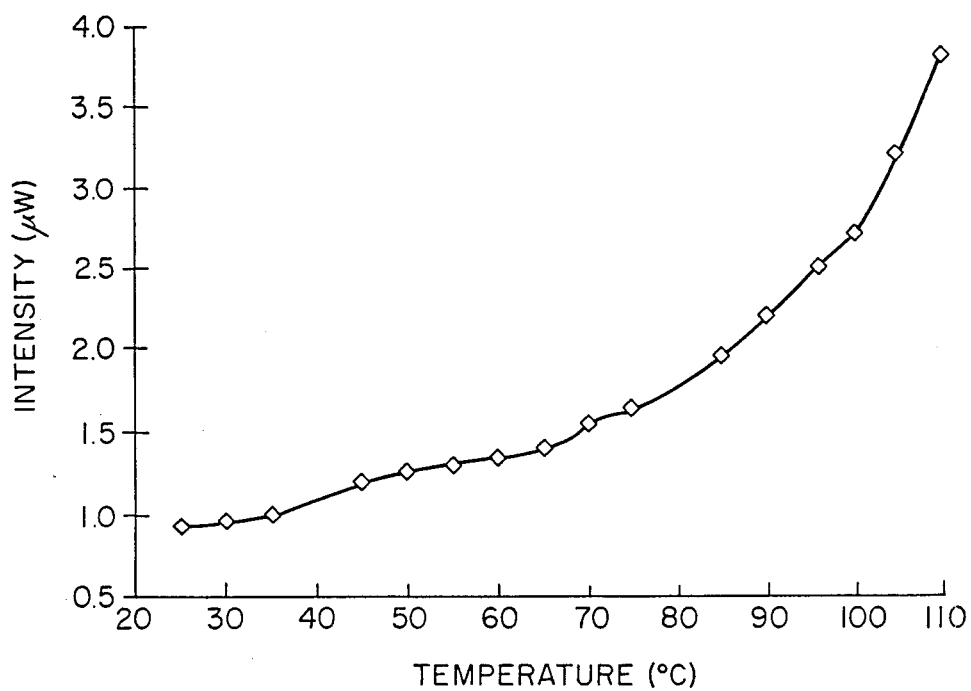
FIG. 8 is a plot showing light intensity versus temperature for the thermochromic diacetylene copolymer HDI-5,7-PTMO-1000 (evaluated using a fiber optic set-up shown in FIGS. 6 and 7).

The fiber cap was then placed in an oil bath 40. A laser beam was then transmitted by the laser source 25. Backscattered light, which was reflected from the surface of the mirror, was directed to the detector 35 by the LANtap GTE Coupler 27. This was repeated a number of times, each time the oil bath 40 being at a different temperature. A graph of light intensity versus temperature was then generated by this procedure as shown in FIG. 8.

These data show that it is possible to optically detect temperature by monitoring changes in the attenuation of the backscattered laser light which occur as the absorption band of the copolymer shifts with temperature. These results show that the unique properties of the copolymers can be exploited in optical sensor applications. The excellent film forming properties and mechanical properties of the copolymers are well suited for this application.

Industrial Applicability

This invention described herein relates to a diacetylene-segmented copolymers. These materials can be used in thermal-sensing devices, pressure-sensing devices, stress indicators, or as coatings, non-linear optical materials, processable thermoplastic polydiacetylenes, and high-strength elastomers with post-fabrication controllable mechanical profiles.

Equivalents

Those skilled in the art will recognize or be able to ascertain, using no more than routine experimentation, many equivalents to the specific embodiments described herein.

Such equivalents are intended to be covered by the following claims.

I claim:

1. A segmented copolymer comprising first and second segments, said first segment containing at least one diacetylene unit and said second segment being a low molecular weight polymer containing no diacetylene units.

2. A segmented copolymer of claim 1, wherein said second segment is incompatible with said first segment thereby forming a two-phase domain morphology.

3. A segmented copolymer of claim 2, wherein said second segment is a soft-flexible segment.

4. A segmented copolymer of claim 3, wherein said second segment is elastomeric.

5. A segmented copolymer of claim 4, wherein said first and second segments are linked by urethane linkages.

6. A segmented copolymer of claim 4, wherein said first and second segments are linked by ester linkages.

7. A segmented copolymer of claim 4, wherein said first and second segments are linked by amide linkages.

8. A segmented copolymer as recited in claim 2 having the formula:

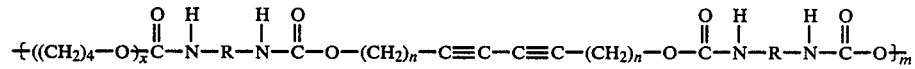

wherein R is selected from the group consisting of

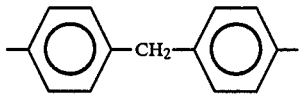

and —(CH$_2$)$_6$—, and n=1, n=4 or n=9.

9. A segmented copolymer of claim 8 having cross-polymerized diacetylene units.

10. A segmented copolymer as recited in claim 2 having the formula:

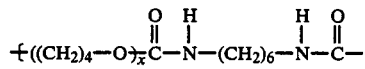

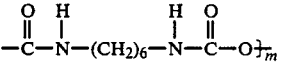

11. A segmented copolymer of claim 10 having diacetylene units cross-polymerized to provide thermochromic properties.

12. A segmented copolymer as recited in claim 2 having the formula:

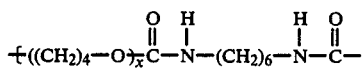

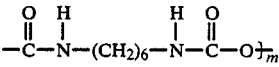

wherein n=1 or n=4.

13. A segmented copolymer of claim 12 having diacetylene units cross-polymerized to provide mechanochromic properties.

14. A segmented copolymer as recited in claim 2 having the following formula:

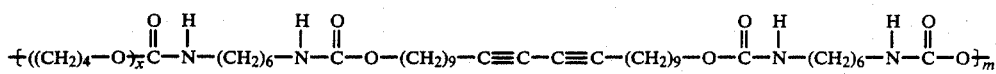

15. A segmented copolymer as recited in claim 2 having the following formula:

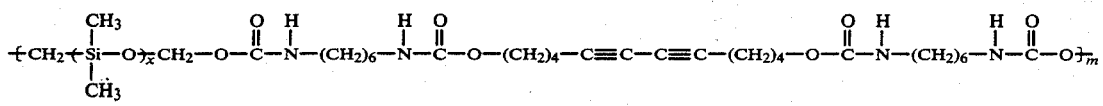

16. A segmented copolymer of claim 15 having diacetylene units cross-polymerized to provide thermochromic properties.

17. A segmented copolymer as recited in claim 2 having the following formula:

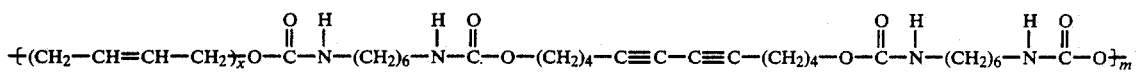

18. A segmented copolymer of claim 17 having diacetylene units cross-polymerized to provide thermochromic properties.

19. A segmented copolymer as recited in claim 2 having the following formula:

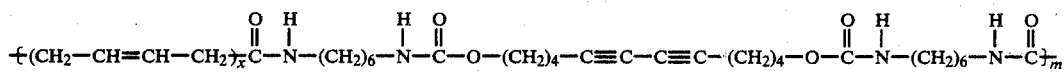

20. A segmented copolymer of claim 19 having diacetylene units cross-polymerized to provide thermochromic properties.

21. A segmented copolymer as recited in claim 2 having the following formula:

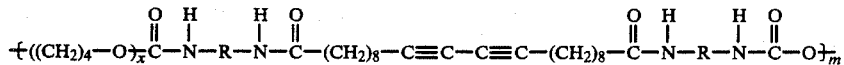

wherein R = 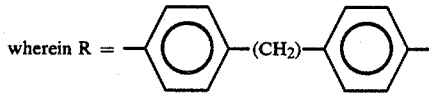

22. A mechanochromic segmented copolymer containing cross-polymerized diacetylene units.

23. A thermochromic segmented copolymer containing cross-polymerized diacetylene units.

24. An improved method of detecting temperature utilizing a fiber optic system, wherein the improvement comprises:

using a segmented copolymer containing cross-polymerized diacetylene units in the temperature sensor.

25. An improved method of detecting temperature as recited in claim 24, wherein the segmented copolymer is HDI 5,7-PTMO-1000 which contains cross-polymerized diacetylene units.

26. A segmented copolymer of claims 1, 2, 3, 4, 5, 6 or 7 having crossed-polymerized diactylene units.

* * * * *